(12) United States Patent
Ruhlander et al.

(10) Patent No.: US 7,281,748 B2
(45) Date of Patent: Oct. 16, 2007

(54) TAILGATE LIFT-AND-SECURE CABLE AND LATCH ASSEMBLY

(75) Inventors: Gregory Phillip Ruhlander, Rochester Hills, MI (US); Patrick Eugene Meysenburg, Hannibal, MO (US); David Thomas Flanagan, Columbia, MO (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 10 days.

(21) Appl. No.: 11/103,417

(22) Filed: Apr. 11, 2005

(65) Prior Publication Data

US 2006/0226672 A1 Oct. 12, 2006

(51) Int. Cl.
*B62D 33/00* (2006.01)
*B62D 33/03* (2006.01)

(52) U.S. Cl. .................... 296/57.1; 296/50; 49/394; 292/144; 292/DIG. 42

(58) Field of Classification Search ............ 292/2, 292/28, 38, 50, 84, 125, 133, 141, 144, 171, 292/201, 225, 235, DIG. 42; 49/394, 395; 296/50, 53, 55, 56, 57.1
See application file for complete search history.

(56) References Cited

U.S. PATENT DOCUMENTS

| | | | | | |
|---|---|---|---|---|---|
| 234,614 | A * | 11/1880 | Riggs | ............................ | 296/53 |
| 701,884 | A * | 6/1902 | Hon | ............................ | 296/55 |
| 1,833,572 | A * | 11/1931 | Hardesty | ...................... | 70/262 |
| 3,396,999 | A * | 8/1968 | Knapp | ........................... | 292/39 |
| 4,288,944 | A * | 9/1981 | Donovan | ...................... | 49/395 |
| 4,470,277 | A * | 9/1984 | Uyeda | .......................... | 70/118 |
| 4,784,415 | A * | 11/1988 | Malaval | ....................... | 292/144 |
| 5,245,846 | A * | 9/1993 | James | .......................... | 70/118 |
| 5,263,347 | A * | 11/1993 | Allbaugh et al. | ............. | 70/257 |
| 5,513,468 | A * | 5/1996 | Diestelmeier | ................ | 49/375 |
| 5,954,383 | A * | 9/1999 | Beck et al. | ................... | 296/50 |
| 6,030,019 | A * | 2/2000 | Stiltner et al. | ............. | 296/57.1 |
| 6,126,223 | A * | 10/2000 | Rayburn | ..................... | 296/57.1 |
| 6,196,609 | B1 * | 3/2001 | Bowers | ...................... | 296/57.1 |
| 6,209,366 | B1 * | 4/2001 | Zagoroff | ...................... | 70/208 |
| 6,364,392 | B1 * | 4/2002 | Meinke | ......................... | 296/62 |
| 6,550,840 | B2 * | 4/2003 | Rayburn | ..................... | 296/57.1 |
| 6,773,047 | B2 * | 8/2004 | Gruber | ........................ | 296/57.1 |
| 6,820,910 | B1 * | 11/2004 | Tan et al. | .................. | 296/57.1 |
| 6,832,801 | B2 * | 12/2004 | Zagoroff | ..................... | 296/57.1 |
| 6,854,781 | B2 * | 2/2005 | Roach | ........................ | 296/57.1 |

* cited by examiner

*Primary Examiner*—Carlos Lugo
(74) *Attorney, Agent, or Firm*—Richard M. Mescher; Porter, Wright, Morris & Arthur LLP; Dean B. Watson

(57) ABSTRACT

A lift and secure latch assembly for a vehicle tailgate includes a pair of cables capable of applying upward force to the tailgate and a tensioning mechanism positioned within the tailgate and connected to the support members to apply tension thereto. One of the cables extends from a first lateral end of the tailgate and the other of the cables extends from a second lateral end of the tailgate. The tensioning mechanism is operable between a first position wherein the cables are retracted with the tailgate closed and a second position wherein the cables are extended with the tailgate open. The tensioning mechanism includes a spring member biasing the tensioning mechanism toward the first position. A latch selectively engages the tensioning mechanism to releasably secure the tensioning mechanism in the first position with the tailgate closed. Preferably, the latch is centrally positioned between lateral ends of the tailgate.

9 Claims, 5 Drawing Sheets

TAILGATE LIFT-AND-SECURE CABLE AND LATCH ASSEMBLY

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to tailgates for motor vehicles and, more particularly, to tailgate latch assemblies for motor vehicles.

BACKGROUND OF THE INVENTION

Motor vehicles such as pickup trucks typically have a tailgate for selectively enclosing a truck box. The tailgate is typically pivotably mounted at a lower edge to side walls defining the truck box. Mounted in this manner, the tail gate is pivotable between a vertical closed position wherein the tailgate closes a rear opening of the truck box and a horizontal open position wherein the truck box is accessible through the rear opening. Typically, a latch is provided at each side of the tailgate to secure the tailgate in the closed position and a centrally located handle or lever is provided on the outer side of the tailgate to selectively release the side latches and permit the tailgate to move from the closed position to the open position. Typically the tailgate is provided with straps or cables at its side to limit downward movement to an open position wherein the tailgate is generally level with the bed of the truck box.

Tailgates for pickup trucks typically range in weight from about 40 to about 70 pounds. Tailgates for sport utility vehicles can even be heavier because they often also house window lift and control mechanisms. As a result assistance is desirable for opening and closing the tailgate. There are many prior devices for providing lift assistance to tailgates. For example, see U.S. Pat. Nos. 5,954,383, 6,126,223, 6,196,609, 6,550,840, 6,773,047, and 6,832,801, the disclosures of which are expressly incorporated herein in their entireties by reference. While these devices may be effective in providing lift assistance, they are not suitable for mass production and add to the cost and complexity of the tailgates. Additionally, because they are visible, they are not very aesthetically pleasing.

In an effort to become more aesthetically pleasing, tailgate lift assist systems were located within the tailgates so that they are not visible. For example, see U.S. Pat. Nos. 6,820, 910 and 6,854,781, the disclosures of which are expressly incorporated herein in their entireties by reference. While these devices are more aesthetically pleasing, they still add cost, complexity, and weight.

The motor vehicle industry has a never ending desire to reduce weight, to reduce packaging size, and to reduce manufacturing costs. Accordingly, there is a need in the art for improved tailgate assemblies for motor vehicles.

SUMMARY OF THE INVENTION

The present invention provides a lift and secure latch assembly for a motor vehicle tailgate which overcomes at least some of the above-noted problems of the related art. According to the present invention, a lift and secure latch assembly for a vehicle tailgate comprises, in combination, a pair of cables capable of applying upward force to the tailgate and a tensioning mechanism connected to the support members to apply tension thereto. The tensioning mechanism is operable between a first position wherein the cables are retracted with the tailgate in the closed position and a second position wherein the cables are extended with the tailgate in the open position. The tensioning mechanism includes a spring member biasing the tensioning mechanism toward the first position. A latch selectively engages the tensioning mechanism to releasably secure the tensioning mechanism in the first position with the tailgate in the closed position.

According to another aspect of the present invention, a lift and secure latch assembly for a vehicle tailgate comprises, in combination, a pair of cables capable of applying upward force to the tailgate and a tensioning mechanism positioned within the tailgate and connected to the support members to apply tension thereto. One of the pair of cables extends from a first lateral end of the tailgate and the other of the pair of cables extends from a second lateral end of the tailgate. The tensioning mechanism is operable between a first position wherein the cables are retracted with the tailgate in the closed position and a second position wherein the cables are extended with the tailgate in the open position. The tensioning mechanism includes a spring member biasing the tensioning mechanism toward the first position. A latch selectively engages the tensioning mechanism to releasably secure the tensioning mechanism in the first position with the tailgate in the closed position. The latch is centrally positioned between lateral ends of the tailgate.

According to yet another aspect of the present invention, a motor vehicle comprises, in combination, a structure, a tailgate hinged to the structure and pivotable between closed and open positions, a pair of cables capable of applying upward force to the tailgate, and a tensioning mechanism positioned within the tailgate and connected to the support members to apply tension thereto. One of the pair of cables is fixed to the structure and extends into a first lateral end of the tailgate and the other of the pair of cables is fixed to the structure and extends into a second lateral end of the tailgate. The tensioning mechanism is operable between a first position wherein the cables are retracted with the tailgate in the closed position and a second position wherein the cables are extended with the tailgate in the open position. The tensioning mechanism includes a spring member biasing the tensioning mechanism toward the first position. A latch selectively engages the tensioning mechanism to releasably secure the tensioning mechanism in the first position with the tailgate in the closed position. The latch is centrally positioned on the tailgate between lateral ends of the tailgate.

From the foregoing disclosure and the following more detailed description of various preferred embodiments it will be apparent to those skilled in the art that the present invention provides a significant advance in the technology and art of tailgate assemblies for motor vehicles. Particularly significant in this regard is the potential the invention affords for providing a high quality, reliable, low weight and low cost assembly having a relatively small package size. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
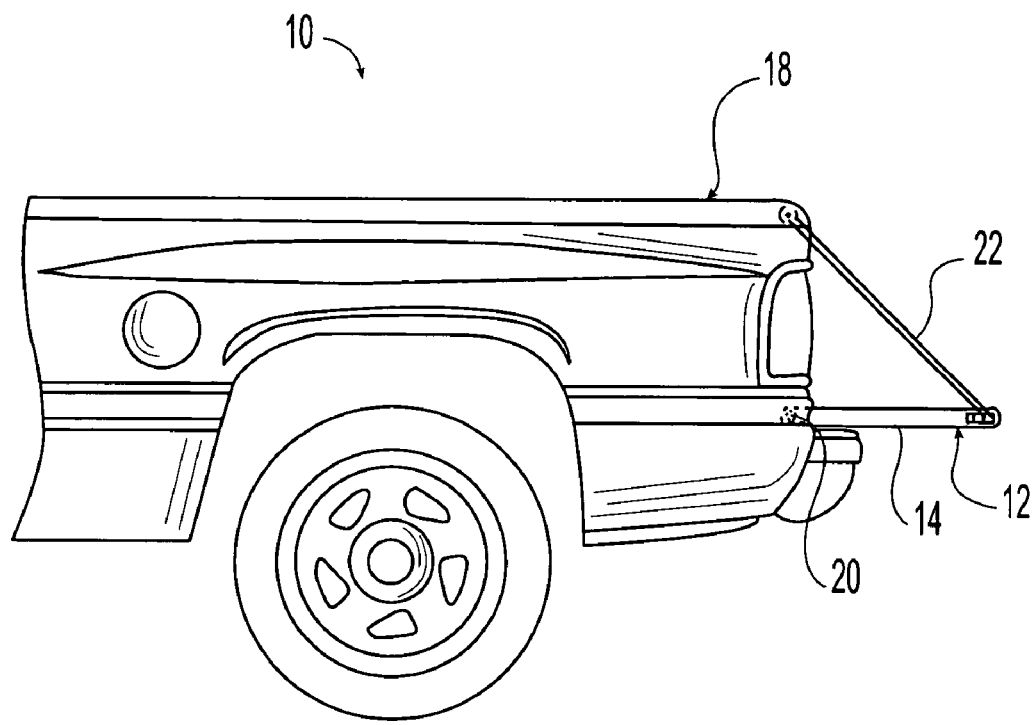
FIG. 1 is a fragmented side elevational view of a motor vehicle having a tailgate lift and latch assembly according to a first preferred embodiment of the present invention.

It should be understood that the appended drawings are not necessarily to scale, presenting a somewhat simplified representation of various preferred features illustrative of the basic principles of the invention. The specific design features of a tailgate assembly as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tailgate assembly illustrated in the drawings. In general, up or upward generally refers to an upward direction within the plane of the paper in FIG. 1 and down or downward generally refers to a downward direction within the plane of the paper in FIG. 1. Also in general, fore or forward refers to a direction toward the front of the motor vehicle, that is, generally toward the left within the plane of the paper in FIG. 1 and aft or rearward refers to a direction toward the rear of the vehicle, that is, generally toward the right within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved tailgate assemblies disclosed herein. The following detailed discussion of various alternative and preferred embodiments will illustrate the general principles of the invention with reference to a tailgate assembly for use with a pickup truck. Other embodiments suitable for other applications, such as tailgates for sport utility vehicles, cross-over vehicles, trailers or the like will be apparent to those skilled in the art given the benefit of this disclosure.

Figure 2:
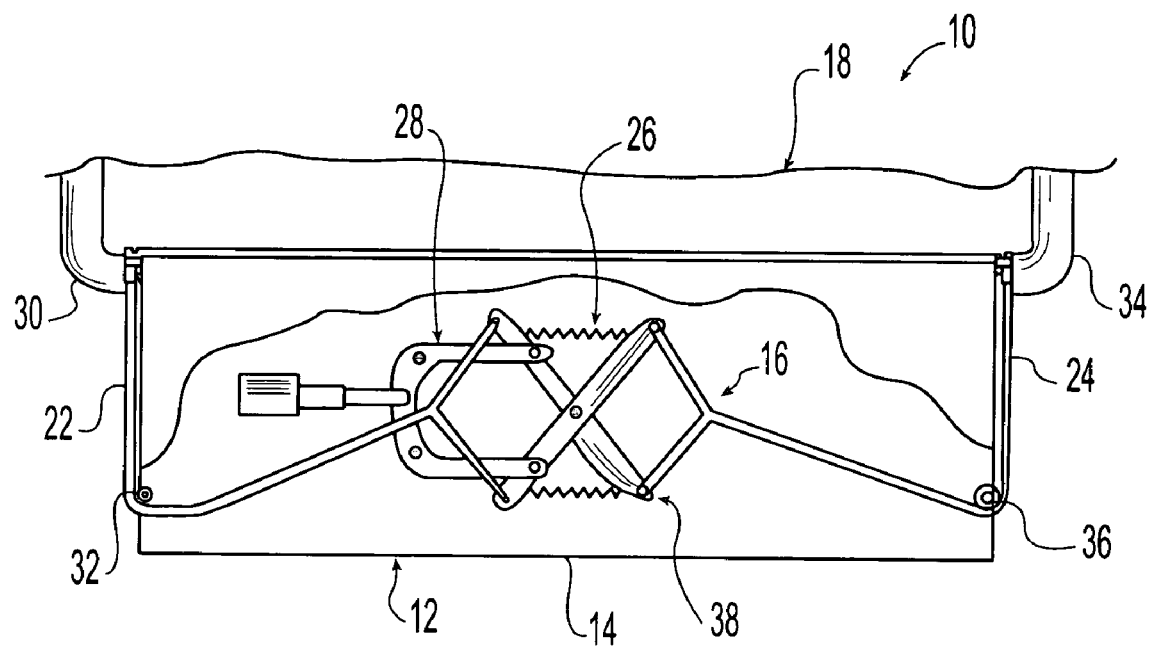
FIG. 2 is a fragmented top plan view of the motor vehicle of FIG. 1 in the area of the tailgate, wherein an inner wall of the tailgate is removed for clarity.
Figure 3:
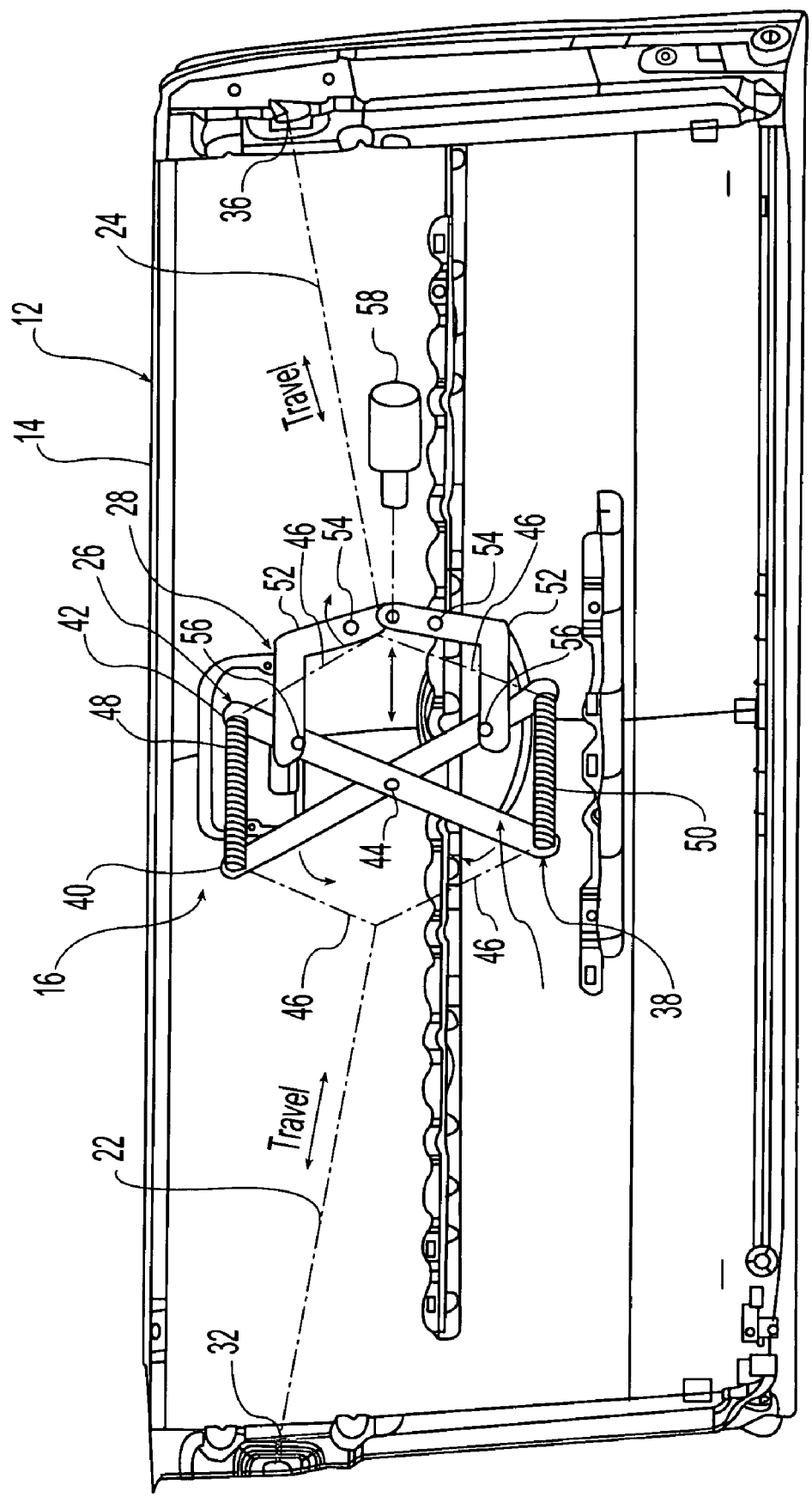
FIG. 3 is an enlarged elevational view of the tailgate of FIGS. 1 and 2, wherein an inner wall of the tailgate is removed for clarity.

Referring now to the drawings, FIGS. 1 to 3 show a motor vehicle 10 in the form of a pickup truck having a tailgate assembly 12 according to a preferred embodiment of the present invention. The illustrated tailgate assembly 12 includes a tailgate 14 and a lift and secure latch assembly 16. The tailgate 14 is attached to a motor vehicle structure 18 with a hinge 20 at a lower edge of the tailgate 14. The tailgate 14 pivots about the hinge 20 between a first or closed position wherein the tailgate 14 is generally vertical and a second or open position wherein the tailgate 14 is generally horizontal.

The illustrated lift and secure latch assembly 16 includes a pair of elongate support members 22, 24 capable of applying upward force to the tailgate 14, a tensioning mechanism 26 connected to the support members 22, 24 to apply tension thereto, and a latch 28 selectively engaging the tensioning mechanism 26 to releasably secure the tensioning mechanism 26 in the first position with the tailgate 14 in the closed position. The support members 22, 24 can be cables, cords, webs, or any other suitable flexible elongate member. A first end of the first support member or cable 22 is secured to a left sidewall 30 of the motor vehicle structure 18 and extends in a longitudinal direction of the motor vehicle 10 toward a left or first lateral edge of the tailgate 14 where the first cable 22 enters the tailgate 14. The first cable 22 engages a first pulley, roller or slide bushing 32 which directs the first cable 22 in a rightward lateral direction of the motor vehicle 10 within the tailgate 14 to the tensioning mechanism 26. A second end of the first cable 22 is connected to the tensioning mechanism 26 as described in more detail hereinafter. A first end of the second support member or cable 24 is secured to a right sidewall 34 of the motor vehicle structure 18 and extends in a longitudinal direction of the motor vehicle 10 toward right or second lateral edge of the tailgate 14 where the second cable 24 enters the tailgate 14. The second cable 24 engages a second pulley, roller or slide bushing 36 which directs the second cable 22 in a leftward lateral direction of the motor vehicle 10 within the tailgate 14 to the tensioning mechanism 26. A second end of the second cable 24 is connected to the tensioning mechanism 26 as described in more detail hereinafter.

The illustrated tensioning mechanism 26 is centrally located within the tailgate 14 and is operable between a first position (shown in FIG. 3) wherein the cables 22, 24 are retracted so that the tailgate 14 is the closed position and a second position wherein the cables 22, 24 are extended with the tailgate 14 in the open position. The illustrated tensioning member 26 includes a scissors linkage 38 having a first and second elongate legs or links 40, 42 pivotably secured at their centers at a common pivot 44. The first cable 22 is secured to a first or upper end of the first link 40 and a second or lower end of the of the second link 42. The first cable 22 is secured to the first and second links 40, 42 by attachment links or cables 46. The second cable 24 is secured to a first or upper end of the second link 42 and a second or lower end of the of the first link 40. The second cable 24 is secured to the first and second links 40, 42 by attachment links or cables 46. The upper ends of the first and second links 40, 42 are connected by a first spring member 48 and the lower ends of the first and second links are connected by a second spring member 50 to bias the links 40, 42 toward the first position of the tensioning member 26 wherein the cables 22, 24 are retracted and the tailgate 14 is in the closed position. The illustrated first and second spring members 48, 50 are coil tension springs.

The illustrated latch 28 is a clamping mechanism having a pair of retaining and releasing arms 52 pivotably mounted to the tailgate 14 and movable between a first or retaining position (shown in FIG. 3) and a second or releasing position. The illustrated arms 52 are mounted at spaced apart pivots 54. In the retaining position, the arms 52 clamp first and second pins 56 of the first and second links 40, 42 to secure the links 40, 42 and retain the tensioning mechanism 26 in its first position. Thus, the tailgate 14 is secured in its first or closed position by the tensioned first and second cables 22, 24. In the releasing position, the arms 52 are free of the pins 56 so that the links 40, 42 can pivot and the tensioning mechanism 26 can move to its second position. The illustrated latch 28 is provided with an electronic release 58 in the form of an electric linear actuator. The actuator 58 is operably connected to ends of the arms 52 so that linear motion of the actuator 58 pivots the arms 52 between the retaining and releasing positions. Controls for the actuator 58 can be located at any suitable position of the tailgate 14 or the motor vehicle 10. The electronic release 58 enables the exterior surface of the tailgate 14 to be smooth and free of traditional manual release handles to provide an aesthetically pleasing appearance. It is noted that alternatively a manual release can be provided for the latch 28 such as, for example, a manually actuated release handle or lever operatively connected to the arms 52. It is also noted that the latch 28 can alternatively take any other suitable form within the scope of the present invention.

In operation, with the tensioning device 26 in its first position and the latch 28 in its retaining position to secure the tensioning device 26 in its first position, the tailgate 14 is secured in its closed position by the tensioned first and second cables 22, 24. When it is desired to open the tailgate 14, the operator actuates the linear actuator 58 which pivots the latch arms 52 so that the latch 28 is moved to its releasing position and the tailgate 14 can be lowered. As the tailgate 14 lowers, the scissor linkage 38 extends against the bias of the spring members 48, 50, slowing the tailgate's angular velocity. Once the scissors linkage 38 reaches its second or extended position, the tailgate 14 is held in its generally horizontal open position by the first and second cables 22, 24 and the weight of the tailgate 14. If desired, the latch 28 can be adapted to also, or a second latch can be provided to, selectively secure the tensioning device 26 in its extended position. When the operator desires to close the tailgate 14, the operator lifts the tailgate 14 as the spring members 48, 50 relieve part of the weight of the tailgate 14 to assist in lifting the tailgate 14. As the tailgate 14 raises, the scissors linkage 38 retracts due to the bias of the spring members 38, 40. Once the scissors linkage 38 reaches its first or retracted position, a standard over travel mechanism is used to allow the latch 28 to automatically move to its retaining position and/or the operator initiates the linear actuator 58 to move the arms 52 to the retaining position where they engage the pins 56 and secure the tensioning mechanism 26 in its first position. Again, with the tensioning device 26 secure in its first position, the tailgate 14 is secured in its closed position by the tensioned first and second cables 22, 24.

Figure 4:
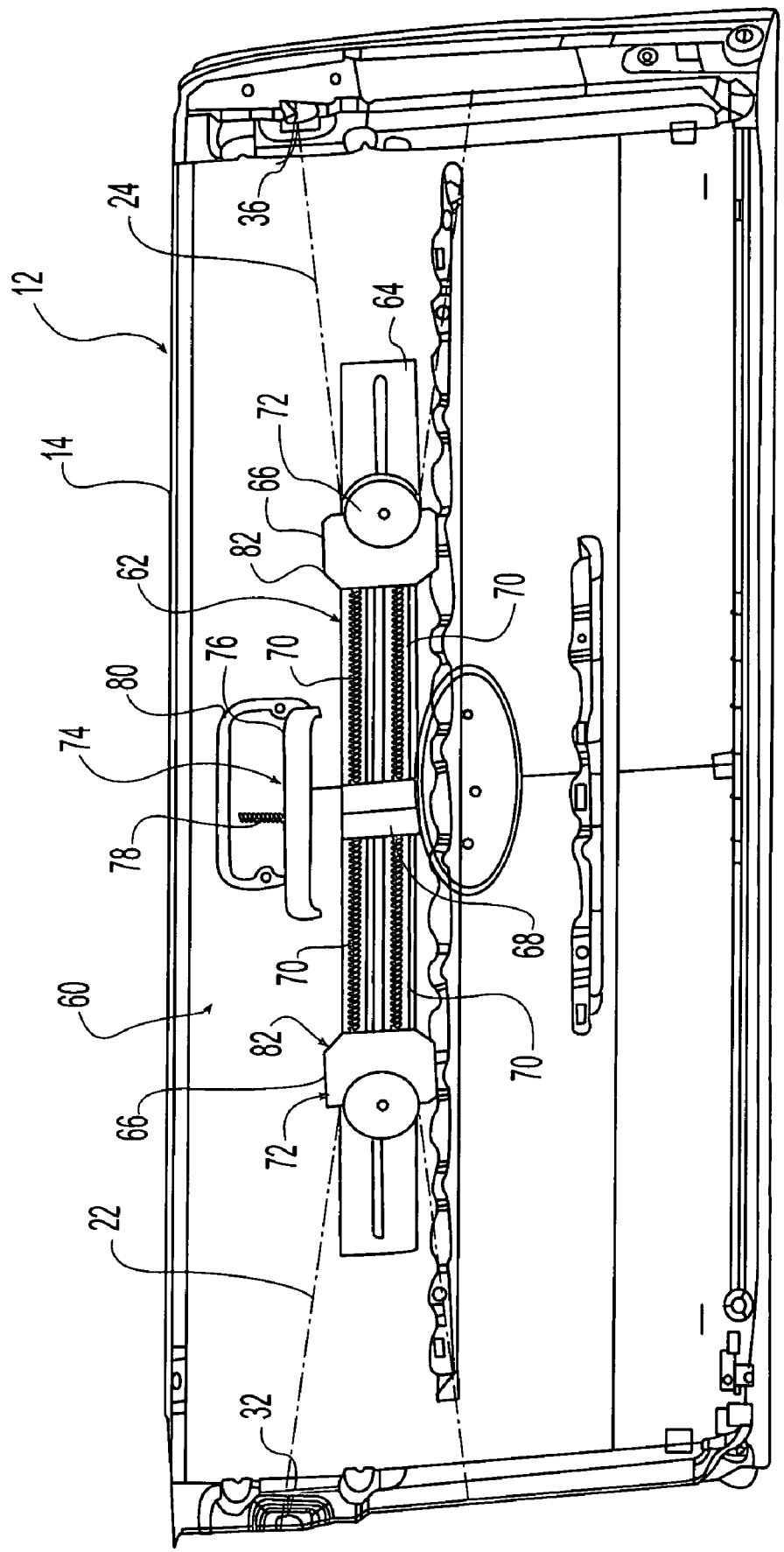
FIG. 4 is an enlarged elevational view of a tailgate having a tailgate lift and latch assembly according to a second preferred embodiment of the present invention, wherein an inner wall of the tailgate is removed for clarity.

FIG. 4 illustrates a lift and secure latch assembly 60 according to a second embodiment of the present invention wherein like reference numbers are used to identify like structure. The illustrated tensioning member 62 includes a substantially horizontal and laterally extending track or slide 64 secured to the tailgate 14. A pair of sliders or travelers 66 are operably connected to the track 64 for horizontal movement along the length of the track 64, that is, in a lateral direction of the motor vehicle 10. A pylon or fixed structure 68 is provided at the center of the track 64. A pair of spring members 70 extend in each direction from the pylon 68 to the travelers 66 to bias the travelers 66 toward the first or retracted position of the tensioning member 62. Pulleys or rollers 72 are rotatably mounted to the travelers 66. The second end of the first cable 22 extends around the pulley 72 of the first traveler 66 and is secured to the first or left lateral edge of the tailgate 14. The second end of the second cable 24 extends around the pulley 72 of the second traveler 66 and is secured to the second or right lateral edge of the tailgate 14. The spring members 70 bias the travelers 66 toward the first position of the tensioning member 62 wherein the cables 22, 24 are retracted and the tailgate 14 is in the closed position. The illustrated spring members 70 are coil tension springs.

The illustrated latch 74 includes latch member 76 that is pivotably mounted to the tailgate 14 at a central location above the pylon 68. The latch member 76 pivots between a first or retaining position and a second or releasing position. The illustrated latch member 76 is biased to the retaining position by a spring member 78. In the retaining position with the travelers 66 in the first or retracted position of the tensioning mechanism 62, the latch member 76 blocks the travelers 66 from moving laterally outward from the first or retracted position of the tensioning mechanism 62. Thus, the tailgate 14 is secured in its first or closed position by the tensioned first and second cables 22, 24. A manual release or handle 80 is secured to the latch member 76 so that the latch member 76 can be manually moved out of the retaining position to release the travelers 66 and lower the tailgate 14. The travelers 66 are provided with camming surfaces 82 sized and shaped to engage the latch member 76 and resiliently move the latch member 76 against the bias of the spring member 70 so that the travelers 66 can move from the second or extended position to the first or retracted position and automatically be secured in the first or retracted position by the latch member 76. It is noted that alternatively any other suitable latch can be utilized.

In operation, with the tensioning mechanism 62 in its first position and the latch member 76 in its retaining position to secure the tensioning mechanism 62 in its first position, the tailgate 14 is secured in its closed position by the tensioned first and second cables 22, 24. When it is desired to open the tailgate 14, the operator manually lifts the handle 80 so that the latch member 76 moves to its releasing position and the tailgate 14 can be lowered. As the tailgate 14 lowers, the travelers 66 move laterally outward along the track 64 against the bias of the spring members 70 slowing the tailgate's angular velocity. Once the travelers 66 reach their second or extended position, the tailgate 14 is held in its generally horizontal open position by the first and second cables 22, 24 and the weight of the tailgate 14. Preferably, the travelers 66 reach a hard stop at the end of the track 64 to define the second position. If desired, the latch 74 can be adapted to also, or a second latch can be provided to, selectively secure the tensioning mechanism 62 in its extended position. When the operator desires to close the tailgate 14, the operator lifts the tailgate 14 as the spring members 70 relieve part of the weight of the tailgate 14 to assist in lifting the tailgate 14. As the tailgate 14 raises, the travelers 66 move laterally inward along the track due to the bias of the spring members 70. When the travelers 66 reach the latch member 76, the camming surfaces 82 resiliently move the latch member 76 out of the way against the bias of the spring member 78. Once the travelers 66 reach their first or retracted position, the latch member 76 resiliently snaps back into its retaining position to secure the tensioning mechanism 62 in its first position. Again, with the tensioning mechanism 62 secured in its first position, the tailgate 14 is secured in its closed position by the tensioned first and second cables 22, 24.

Figure 5:
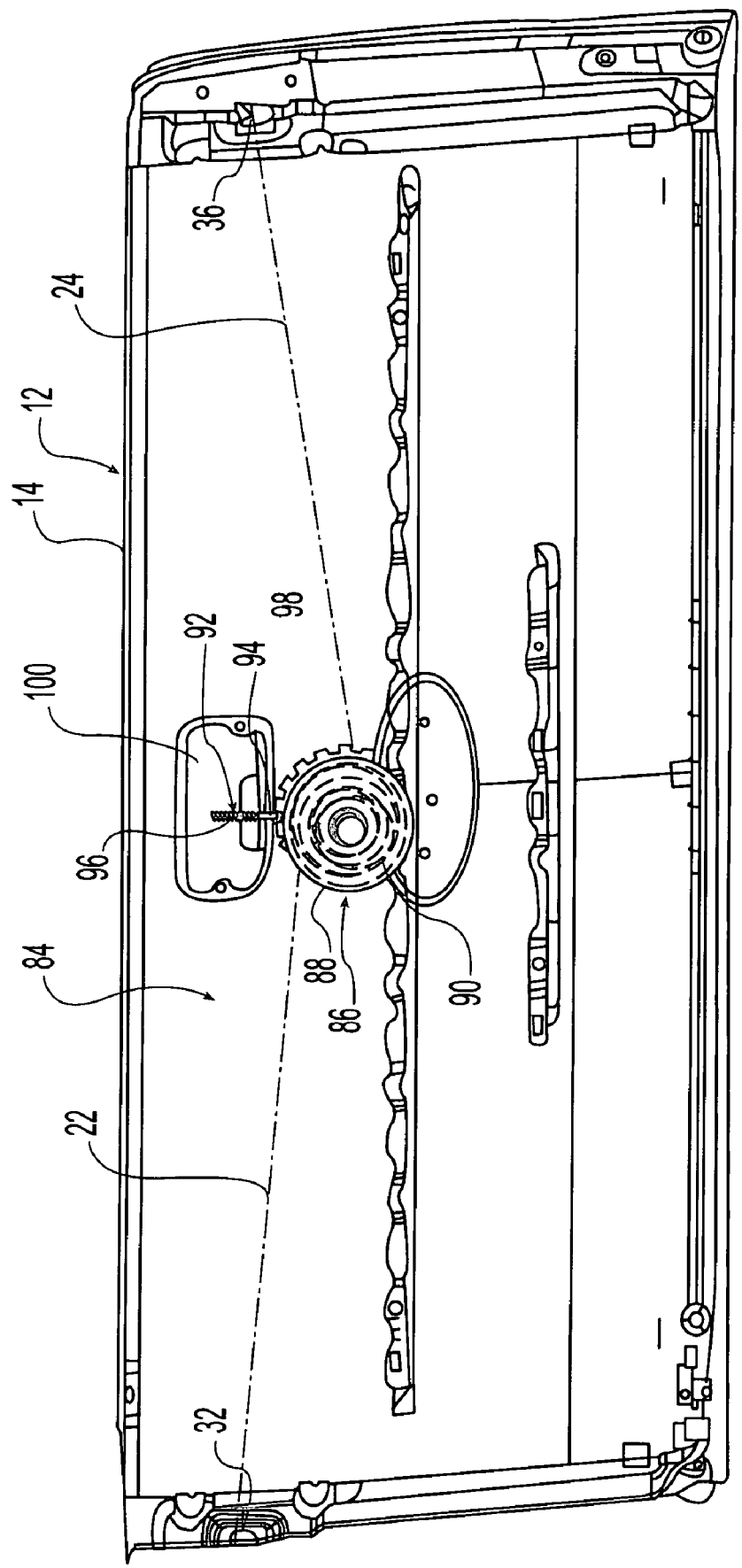
FIG. 5 is an enlarged elevational view of a tailgate having a tailgate lift and latch assembly according to a third preferred embodiment of the present invention, wherein an inner wall of the tailgate is removed for clarity.

FIG. 5 illustrates a lift and secure latch assembly 84 according to a third embodiment of the present invention wherein like reference numbers are used to identify like structure. The illustrated tensioning mechanism 86 includes a drum or reel 88 rotatably secured to the tailgate 14. A spring member 90 biases the reel 88 toward the first or retracted position of the tensioning mechanism 86, that is, to rotate the reel 88 in a direction which winds the cables 22, 24 thereon. The illustrated spring member 90 is a torsion spring. The second end of the first cable 22 and the second end of the second cable 24 are each secured to the reel 88 so that they each wind onto and unwind from the reel 88. The spring member 90 biases the reel 88 toward the first position of the tensioning mechanism 86 wherein the cables 22, 24 are retracted (that is wound onto the reel 88) and the tailgate 14 is in the closed position.

The illustrated latch 92 includes latch member 94 that is mounted to the tailgate 14 at a central location above the reel 88. The latch member 94 moves between a first or retaining position and a second or releasing position. The illustrated latch member 94 is biased to the retaining position by a spring member 96. In the retaining position, the latch member 94 engages a detent 98 secured to the reel 88 to block the reel 88 from rotating from the first or retracted position of the tensioning mechanism 86. Thus, the tailgate 14 is secured in its first or closed position by the tensioned first and second cables 22, 24. A manual release or handle 100 is secured to the latch member 94 so that the latch member 94 can be manually moved out of the retaining position to release the reel 88 and lower the tailgate 14. The illustrated latch has a plurality of detents 98 so that the latch member 94 can secure the reel 88 in both its first and second positions and a plurality of positions therebetween. It is noted that alternatively any other suitable latch can be utilized.

In operation, with the tensioning mechanism 86 in its first position and the latch member 94 in its retaining position to secure the tensioning mechanism 86 in its first position, the tailgate 12 is secured in its closed position by the tensioned first and second cables 22, 24. When it is desired to open the tailgate 14, the operator manually lifts the handle 100 so that the latch member 94 moves to its releasing position and the tailgate 14 can be lowered. As the tailgate 14 lowers, the reel 88 rotates, unwinding the cables 22, 24 therefrom, against the bias of the spring member 90, slowing the tailgate's angular velocity. Once the reel 88 reaches its second or extended position, the tailgate 14 is held in its generally horizontal open position by the first and second cables 22, 24 and the weight of the tailgate 14. Additionally, the latch member 94 engages one of the detents 92 to secure the tensioning mechanism 86 in its extended position. When the operator desires to close the tailgate 14, the operator lifts the handle 100 to disengage the latch 92 and lifts the tailgate 14 as the spring member 90 relieves part of the weight of the tailgate 14 to assist in lifting the tailgate 14. As the tailgate 14 raises, the reel 88 winds the cables 22, 24 due to the bias of the spring member 90. When the reel 80 reaches its first or retracted position, the latch member 94 resiliently snaps back into its retaining position to secure the tensioning mechanism 86 in its first position. Again, with the tensioning mechanism 86 secured in its first position, the tailgate 14 is secured in its closed position by the tensioned first and second cables 22, 24.

Figure 6:
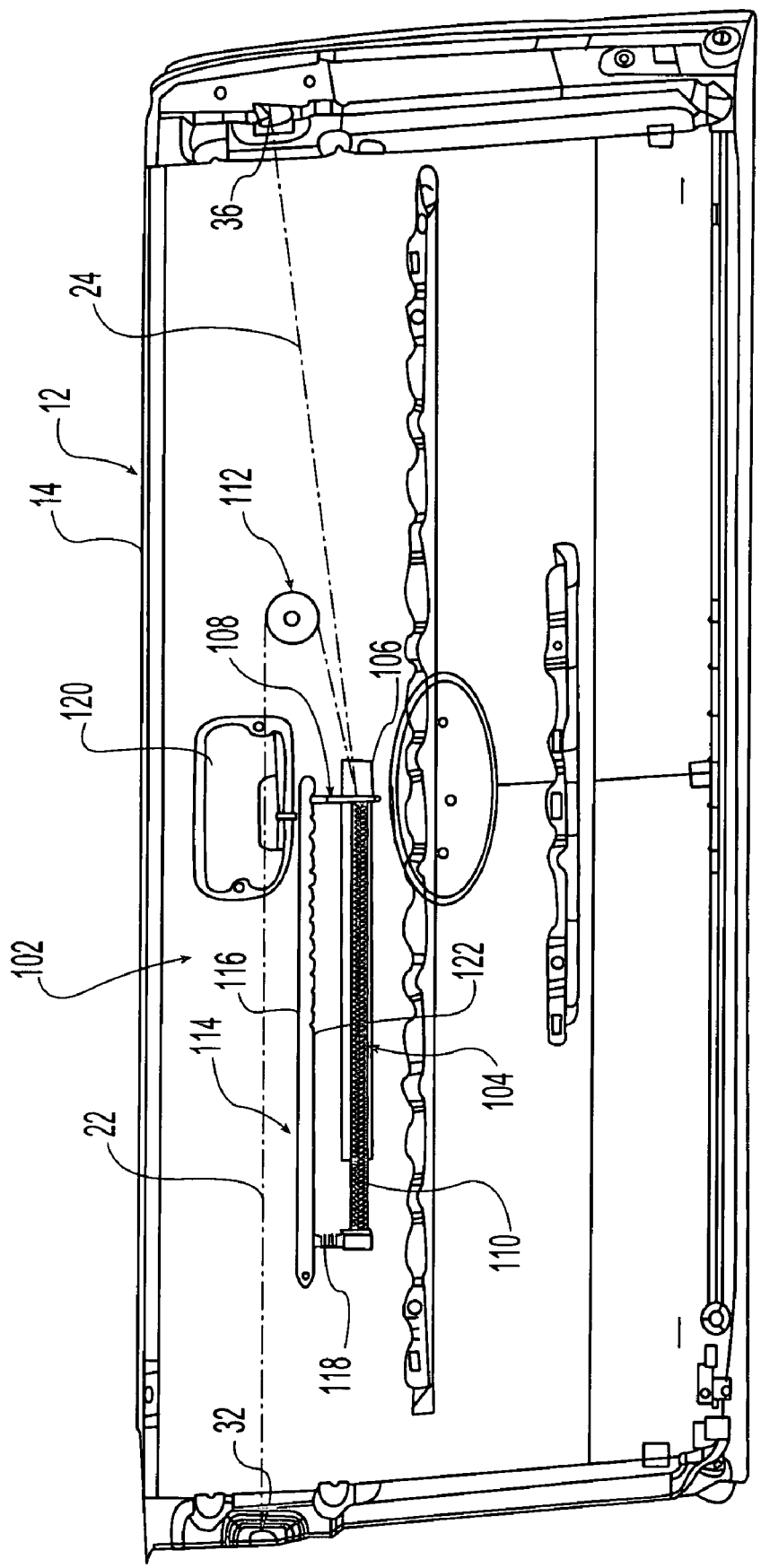
FIG. 6 is an enlarged elevational view of a tailgate having a tailgate lift and latch assembly according to a fourth preferred embodiment of the present invention, wherein an inner wall of the tailgate is removed for clarity.

FIG. 6 illustrates a lift and secure latch assembly 102 according to a fourth embodiment of the present invention wherein like reference numbers are used to identify like structure. The illustrated tensioning mechanism 104 includes a substantially horizontal and laterally extending rail or slide 106 secured to the tailgate 14. A slider 108 is operably connected to the slide 106 for horizontal movement along the length of the slide 106, that is, in a lateral direction of the motor vehicle 10. A spring member 110 extends from the tailgate 14 to the slider 108 to bias the slider 108 toward the first or retracted position of the tensioning mechanism 104. The second end of the first cable 22 extends around a pulley 112 and is secured to the slider 108. The second end of the second cable 24 extends directly to the slider 108 at the same side of the slider 108 as the first cable 22 is connected. The spring member 110 biases the slider 108 toward the first position of the tensioning member wherein the cables 22, 24 are retracted and the tailgate 14 is in the closed position. The illustrated spring member 110 is a coil tension spring.

The illustrated latch 114 includes a ratcheting catch arm 116 that is pivotably mounted to the tailgate 14 above the slide 106. The catch arm 116 pivots between a first or retaining position and a second or releasing position. The illustrated catch arm 116 is biased to the retaining position by a spring member 118. In the retaining position, the catch arm 116 engages the slider 108 to block movement of the slider 108 along the slide 106 from the first or retracted position of the tensioning mechanism 104. Thus, the tailgate 14 is secured in its first or closed position by the tensioned first and second cables 22, 24. A manual release or handle 120 is operably connected to the catch arm 116 so that the catch arm 116 can be manually pivoted out of the retaining position to release the slider 108 and lower the tailgate 14. The illustrated catch arm 116 has a plurality of detents 122 so that the catch arm 116 can secure the slider 108 in both its first and second positions and a plurality of positions therebetween. It is noted that alternatively any other suitable latch can be utilized.

In operation, with the tensioning mechanism 104 in its first position and the catch arm 116 in its retaining position to secure the tensioning mechanism 104 in its first position, the tailgate 14 is secured in its closed position by the tensioned first and second cables 22, 24. When it is desired to open the tailgate 14, the operator manually lifts the handle 120 so that the catch arm 116 pivots to its releasing position and the tailgate 14 can be lowered. As the tailgate 14 lowers, the slider 108 moves along the slide 106 against the bias of the spring member 110, slowing the tailgate's angular velocity. Once the slider 108 reaches its second or extended position, the tailgate 14 is held in its generally horizontal open position by the first and second cables 22, 24 and the weight of the tailgate 14. Additionally, the catch arm 116 engages the slider 108 to secure the tensioning mechanism 104 in its extended position. When the operator desires to close the tailgate 14, the operator lifts the handle 120 to disengage the catch arm 116 and lifts the tailgate 14 as the spring member 118 relieves part of the weight of the tailgate 14 to assist in lifting the tailgate 14. As the tailgate 14 raises, the slider 108 moves along the slide 106 due to the bias of the spring member 118. When the slider 108 reaches its first or retracted position, the catch arm 116 resiliently snaps back into its retaining position to secure the tensioning mechanism 104 in its first position. Again, with the tensioning mechanism 104 secured in its first position, the tailgate 14 is secured in its closed position by the tensioned first and second cables 22, 24.

It is apparent from the above detailed description that the various features of the various embodiments can be utilized with each of the other embodiments. It is also apparent from the above detailed description of the present invention, that the lift and secure latch assemblies according to the present invention reduce the number of required components be eliminating the need for the typical latches at the lateral sides of the tailgate and thus reduces the cost, weight, and complexity of the tailgate assembly.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A lift and secure latch assembly on a vehicle tailgate, the vehicle tailgate pivotable between a closed position and an open position, said lift and secure latch assembly and said vehicle tailgate comprising, in combination:
    a pair of flexible elongate support members capable of applying upward force to the tailgate;
    a tensioning mechanism connected to each of the support members to apply tension to each of the support members;
    wherein the tensioning mechanism is operable between a first position wherein each of the support members are retracted with the tailgate in the closed position and a second position wherein each of the support members are extended with the tailgate in the open position;
    wherein the tensioning mechanism includes a spring member biasing the tensioning mechanism toward the first position;
    wherein the tensioning mechanism includes a scissor linkage with the pair of support members secured to opposite ends of the scissor linkage; and
    a latch selectively engaging the tensioning mechanism to releasably secure the tensioning mechanism in the first position with the tailgate in the closed position.

2. The lift and secure latch assembly according to claim 1, wherein the tensioning mechanism is positioned within the tailgate.

3. The lift and secure latch assembly according to claim 1, wherein the latch is centrally positioned between lateral ends of the tailgate.

4. The lift and secure latch assembly according to claim 1, wherein one of the pair of support members extends from a first lateral end of the tailgate and the other of the pair of support members extends from a second lateral end of the tailgate.

5. The lift and secure latch assembly according to claim 1, wherein the support members extend into the interior of the tailgate and about rollers.

6. The lift and secure latch assembly according to claim 1, wherein the latch includes an electronic release.

7. The lift and secure latch assembly according to claim 1, wherein the spring member is a coil tension spring connecting links of the scissor linkage.

8. A lift and secure latch assembly on a vehicle tailgate, the vehicle tailgate pivotable between a closed position and an open position, said lift and secure latch assembly and said vehicle tailgate comprising, in combination:
    a pair of flexible elongate support members capable of applying upward force to the tailgate;
    wherein one of the pair of support members extends from a first lateral end of the tailgate and the other of the pair of support members extends from a second lateral end of the tailgate;
    a tensioning mechanism positioned within the tailgate and connected to each of the support members to apply tension to each of the support members;
    wherein the tensioning mechanism is operable between a first position wherein the support members are retracted with the tailgate in the closed position and a second position wherein the support members are extended with the tailgate in the open position;
    wherein the tensioning mechanism includes a spring member biasing the tensioning mechanism toward the first position;
    wherein the tensioning mechanism includes a scissor linkage with the pair of support members secured to opposite ends of the scissor linkage;
    a latch selectively engaging the tensioning mechanism to releasably secure the tensioning mechanism in the first position with the tailgate in the closed position; and
    wherein the latch is centrally positioned between lateral ends of the tailgate.

9. A motor vehicle comprising, in combination:
    a structure;
    a tailgate hinged to the structure and pivotable between closed and open positions;
    a pair of flexible elongate support members capable of applying upward force to the tailgate;
    wherein one of the pair of support members is fixed to the structure and extends into a first lateral end of the tailgate and the other of the pair of support members is fixed to the structure and extends into a second lateral end of the tailgate;
    a tensioning mechanism positioned within the tailgate and connected to each of the support members to apply tension to each of the support members;
    wherein the tensioning mechanism is operable between a first position wherein the support members are retracted with the tailgate in the closed position and a second position wherein the support members are extended with the tailgate in the open position;
    wherein the tensioning mechanism includes a spring member biasing the tensioning mechanism toward the first position;
    wherein the tensioning mechanism includes a scissor linkage with the pair of support members secured to opposite ends of the scissor linkage;
    a latch selectively engaging the tensioning mechanism to releasably secure the tensioning mechanism in the first position with the tailgate in the closed position; and
    wherein the latch is centrally positioned on the tailgate between lateral ends of the tailgate.

* * * * *